United States Patent [19]

Vaughan et al.

[11] Patent Number: 5,185,137
[45] Date of Patent: Feb. 9, 1993

[54] DIVALENT TRANSITION-METAL-ALUMINOSILICATE HYDROCARBON CONVERSION CATALYSTS HAVING MAZZITE-LIKE STRUCTURES, ECR-23-D (C-2494)

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 746,264

[22] Filed: Aug. 15, 1991

Related U.S. Application Data

[63] Continuation of Ser. No. 554,628, Jul. 18, 1990, abandoned, which is a continuation-in-part of Ser. No. 283,037, Dec. 5, 1988, abandoned, which is a continuation of Ser. No. 14,203, Feb. 4, 1987, abandoned, which is a continuation of Ser. No. 763,652, Aug. 8, 1985, Pat. No. 4,799,949.

[51] Int. Cl.$^5$ .............................................. C01B 33/34
[52] U.S. Cl. ................................. 423/702; 208/137; 208/46; 502/77; 502/74; 423/709
[58] Field of Search ............... 423/118, 326, 328, 327, 423/330; 502/60, 66, 71, 77, 74; 208/46, 137

[56] References Cited

U.S. PATENT DOCUMENTS

| | | | |
|---|---|---|---|
| 3,941,871 | 3/1976 | Dwyer et al. | 423/326 |
| 4,021,447 | 5/1977 | Rubin et al. | 423/328 |
| 4,208,305 | 6/1980 | Kouwenhoven et al. | 423/328 |
| 4,420,467 | 12/1983 | Whittam | 423/328 |
| 4,552,731 | 11/1985 | Vaughan | 423/328 |
| 4,556,549 | 12/1985 | Valyolsik | 423/328 |
| 4,564,511 | 1/1986 | Desmond et al. | 423/328 |
| 4,576,805 | 3/1986 | Chang et al. | 423/328 |

FOREIGN PATENT DOCUMENTS

| | | | |
|---|---|---|---|
| 0064328 | 11/1982 | European Pat. Off. | 502/60 |
| 1117568 | 6/1968 | United Kingdom | 423/328 |
| 2024790 | 1/1980 | United Kingdom | 423/326 |
| 2033358 | 5/1980 | United Kingdom | 423/328 |

Primary Examiner—R. Bruce Breneman
Attorney, Agent, or Firm—Ronald D. Hantman

[57] ABSTRACT

This invention relates to novel zeolitic compositions having one or more transition metals as well as aluminum and silicon in the framework tetrahedral positions. The composition has a mazzite-like structure. The invention also involves a process of preparation in which at least one divalent transition metal is directly synthesized into the product.

17 Claims, 1 Drawing Sheet

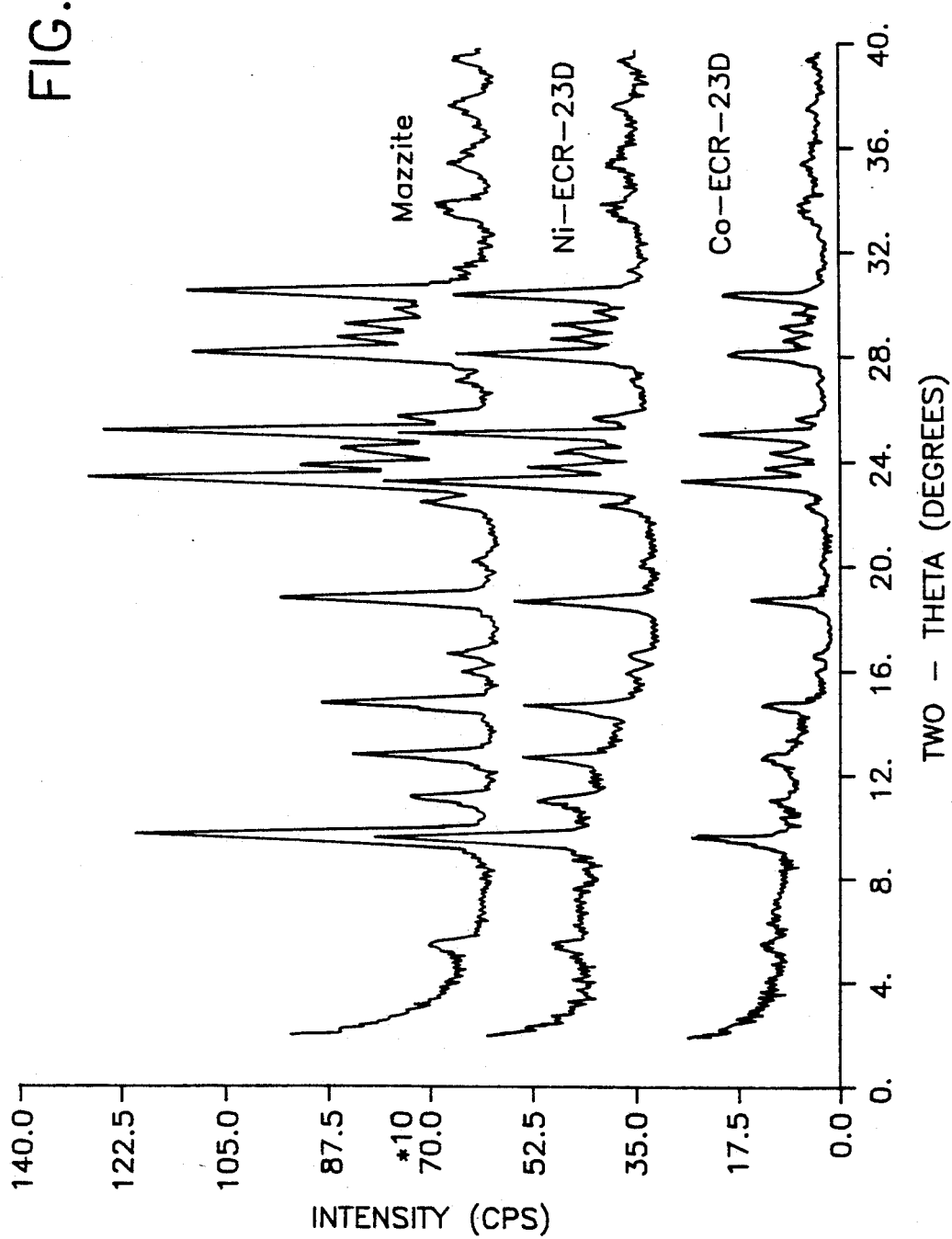

DIVALENT TRANSITION-METAL-ALUMINOSILICATE HYDROCARBON CONVERSION CATALYSTS HAVING MAZZITE-LIKE STRUCTURES, ECR-23-D (C-2494)

This is a rule 60 continuation of U.S. Ser. No. 554,628 filed on July 18, 1990, now abandoned which is a continuation-in-part of U.S. Ser. No. 283,037 filed on Dec. 5, 1988, now abandoned, which is a rule 62 continuation of U.S. Ser. No. 014,203 filed Feb. 4, 1987, now abandoned, which is a rule 62 continuation of U.S. Ser. No. 763,652 filed Aug. 8, 1985, now U.S. Pat. No. 4,799,949.

FIELD OF THE INVENTION

This invention relates to novel zeolitic catalyst compositions having one or more transition metals as well as aluminum and silicon in the framework tetrahedral positions. The composition has a mazzite-like structure. The invention involves a process of preparation in which at least one divalent transition metal is directly synthesized into the product, and the product is ion exchanged and fabricated into a catalyst suitable for such petroleum and petrochemical conversion reactions as reforming, isomerization and hydrocracking, particularly of sulfur containing feedstocks.

BACKGROUND OF THE INVENTION

Zeolites, although generally viewed as having broad compositional substitution possibilities (Pure and Appl. Chem. (1979), 51, p. 1091), ar ⓡusually defined as crystalline hydrated aluminosilicates of Group I and Group II elements. In particular, those elements include sodium, potassium, calcium, magnesium, barium and strontium. The structure of zeolites is typically an aluminosilicate framework based on an indefinitely extending three dimensional network of $AlO_4$ and $SiO_4$ tetrahedra linked to each other by sharing of the corner oxygens. Zeolites are often represented by the empirical formula $M_{2/n}O.Al_2O_3 \cdot x\ SiO_2 \cdot y\ H_2O$. In this oxide formula, x is generally greater or equal to 2 since $AlO_4$ tetrahedra are joined only to $SiO_4$ tetrahedra, and n is the Group I or Group II cation valence. The framework contains channels and interconnected voids which may be occupied by the cation and by water molecules. The cations are often quite mobile and may be exchanged by other cations. Intracrystalline zeolitic water may be reversibly removed. In some zeolites, cation exchange or dehydration may produce structural changes in the framework.

Much zeolite research has focused on the synthesis of zeolite frameworks containing elements other than silicon and aluminum. It is known that gallium ions and germanium ions may be substituted for aluminum and silicon cations in the framework. While an extensive family of aluminum-phosphorus zeolites (AlPO's) has recently been synthesized, the substitution of other elements is the subject of major controversy in the zeolite literature. For instance, U.S. Pat. Nos. 3,329,480 and 3,329,481 both issued to D. A. Young, report the existence of crystalline zirconosilicate and titanosilicate zeolites. A zeolite having chromium in the tetrahedral positions has been described by Yermolenko et al at the Second Oil Union Conference on Zeolites, Leningrad, 1964, pages 171-8 (published 1965). However, D. W. Breck, in Zeolite Molecular Sieves, p. 322, John Wiley & Sons (1974) suggests that the chromium present was not present in a zeolite A structure and furthermore was present as an impurity in insoluble form. The impurity was said to be in the form of a chromium silicate as confirmed by the nature of the water vapor adsoption isotherm. This subject has been reviewed by Barrer, "Hydrothermal Chemistry of Zeolites", Academic Press (1982), p. 294.

Because of the presence of phosphorus in tetrahedral $PO_4$ units in certain rare zeolites, extensive work has been done to synthesize zeolites containing $PO_4$ tetrahedral. Various phosphorus containing zeolites have been prepared and reported in Breck, supra, p. 323 et seq. The synthesis technique for production of phosphorus-containing zeolites generally involves crystallization from a gel in which the phosphorus is first incorporated by a controlled copolymerization and coprecipitation of all of the component oxides in the framework, i.e., aluminate, silicate, and phosphate in the homogeneous gel phase. The crystallization of the gel is then carried out at a temperature between 80° C. and 210° C.

The synthesis of major iron-containing zeolitic structures has been reported. Japanese Kokai 59,121,115, published July 13, 1984, disclosed an aluminosilicate having a faujasite structure and containing coordinated iron. The chemical composition is said to be of the formula $aM_{2/n}O \cdot b\ Fe_2O_3 \cdot Al_2O_3 \cdot cSiO_2$ where M can be H, alkali metal or alkaline earth metal. The symbol n is the valence of M; $a=1\pm0.3$; c is between 4.6 and 100; and a is less than b and both are less than 7. The relation between the IR absorption wave number (y) in $cm^{-1}$ and the crystal lattice parameter $a_o$ is said to be expressed as $Y \leq -116.7a_o + 3920$.

Similarly, U.S. Pat. No. 4,208,305 (Eur. Pat. No. 115,031.A) discloses a crystalline ferrosilicate having the general formula:

$$aM_{2/n}O.(Al_xFe_{1-x})_zO_3.bSiO_2$$

where M is a cation of valence n, $a=0-2.0$, $b=3-100$ and $z=0-0.98$. The composition is said to have a uniform pore diameter of 4–5 Å and a characteristic x-ray powder diffraction pattern of:

| 2θ | d(Å) | Rel. Intensity |
|---|---|---|
| 10.9–11.1 | 8.12–7.97 | M–VS |
| 13.4–13.5 | 6.61–6.56 | M–S |
| 17.4–17.5 | 5.10–5.07 | M–S |
| 21.0–21.1 | 4.23–4.21 | M–S |
| 22.0–22.1 | 4.40–4.02 | M–VS |
| 20.6 | 3.121 | M–S |
| 32.3–32.4 | 2.772–2.763 | M–S |

The composition is formed by maintaining a mixture having a molar oxide composition of: 0–10 $R_2O$:1–15 $M_{2/n}(Al_xFe_{1-x})_2O_3$: 10–200 $SiO_2$:200–1000 $H_2O$ where R is an organic templating agent.

A range of metallo-alumino-phosphates and metallo-silico-alumino-phosphates compositions have recently been reviewed (Flanigen et al, in "Innovations in Zeolite Materials Science", Ed. Grobet et al, SSSC v. 37, p. 13 (Elsevier)). The structure and composition of this invention has not been reported in such families of materials.

None of this literature discloses a transition-metal-aluminosilicate composition having a mazzite-like structure and having the chemical composition disclosed herein, and its use as a hydrocarbon conversion catalyst.

SUMMARY OF THE INVENTION

This invention deals with a transition-metal-aluminosilicate catalyst composition having a mazzite-like structure.

The transition-metal is present in large part in the tetrahedral sites of the zeolitic structure as well as in the cation substitution sites. The generalized chemical composition is:

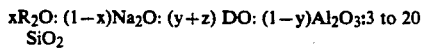

where x=0.01 to 0.67
y=0.02 to 0.4, and
z=y±40%

D is at least one divalent transition metal, e.g., Ni, Co or Zn.

R may comprise salts or hydroxides of tetramethylammonium, bis-dihydroxyethyl-dimethylammonium, triethylenediamine, 1,4 diazobicyclo (2,2,2) octane (DABCO), pyrrolidine or choline, or mixtures of same.

In addition, gallium may be substituted for aluminum and germanium may be introduced for silicon. Na$_2$O may be replaced, to a limited extent, by Li$_2$O and K$_2$O without major development of impurity phases. The product typically will have the divalent metal partitioned between the cation (z) and framework (y) sites. Additionally, the possible formation of organic molecule clathrates (either neutral molecule or organic salt) will alter the apparent cation balance from unity.

The process for synthesizing the inventive transition-metal-aluminosilicate catalyst involves direct introduction of at least one divalent transition-metal into the structure as the material is crystallized.

Experiments with these materials reacted with H$_2$S at high temperatures show that the transition metal in the framework reacts to form the metal sulfide, but that such framework depletion of T atoms does not cause the framework to collapse in the cases of single channel restricted pore systems. (In contrast, in the case of more open and less rigid faujasite frameworks, the lattice does collapse rendering the zeolite amorphous or significantly degraded.) This unique reactivity towards H$_2$S allows these transition metal substituted materials to act as sulfur absorbers, or sinks and scavengers, under reaction conditions and therefore to protect the noble metal (usually Pt or Pd) from deactivation due to sulfur containing feedstocks in catalytic applications. We have discovered that such transition metal framework substituted zeolites seem to be "protected" catalysts as they do not show the deterioration in catalytic activity expected from catalysts containing such high transition metal contents, and may have significant selectivity advantages in some operations. In most hydrocracking, reforming and isomerization systems hydrogen is recycled after removal of most contaminants, such as sulfur compounds, in an external purification system (usually a fixed bed cyclic absorbent process). Sulfur is the major contaminant which poisons the active catalyst promoters. The transition metal framework substituted zeolites of this invention clearly offer the advantages of acting as a polishing sulfur trap in the catalyst itself, providing additional sulfur protection in case of process upsets, inadequate pretreatment or feed contamination. They would seem to offer unique advantages in the instances where the noble metal is particularly sensitive to poisoning, as in the case, for example, of aromatization of paraffinic feedstocks reported by Hughes and co-workers (Proc. 7th International Zeolite Conf., Ed. Murakami et al, p. 725 (1986) Kodansha/Elsevier (Tokyo)).

BRIEF DESCRIPTION OF THE DRAWING

FIG. 1 compares the x-ray diffraction patterns of, respectively, a mazzite zeolite, and Ni and Co-ECR-23-D zeolites made according to the invention.

DESCRIPTION OF THE PREFERRED EMBODIMENTS

The invention herein is, in general terms, an ion exchanged transition-metal-aluminosilicate hydrocarbon catalyst having at least one transition-metal in the tetrahedral positions of a mazzite-like zeolite structure and in the cation substitution sites. A more desirable base composition has a chemical makeup in the range:

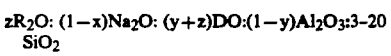

where
x=0.01 to 0.67,
y=0.02 to 0.4,
z±y±40%

D is a divalent metal, e.g., Ni, Co or Zn, and
R is a tetramethylammonium, bishydroxyethyl-dimethylammonium, triethylene diamine, 1,4 diazobicyclo (2,2,2) octane, pyrrolidine, choline, or mixtures of same.

The added divalent transition metal creates a tendency for the metal to partition between the framework and the cation positions, presumably to offset the higher framework negative charge with divalent cations in a restricted number of sites.

Each of these compositions is quite similar in structure to the mazzite-like zeolite structure but has transition-metal ions in tetrahedral framework positions in addition to or in place of Al$^{3+}$ and Si$^{4+}$. As will be discussed below, the structure of this transition-metal aluminosilicate, ECR-23-D, has two distinctly different tetrahedral positions. Given the size and electronic differences between the transition metal and Si, the silicon ions might be expected to segregate to one position and the transition-metal ions to the other. However, this has not been proven as yet.

Mazzite-type materials are considered to include the mineral itself as well as its aluminosilicate isostructure ZSM-4 (British Patent 1,117,568) and zeolite omega (British Patent 1,178,186). Although there are theoretical proposals for the structure of zeolite omega (Barrer and Villiger, Chem. Soc. Chem. Comm. (1969), p.659), the later discovery of the mineral mazzite and the solution of its structure (Galli, Cryst. Struct. Comm. (1974), 3, p. 339) led to the conclusion that mazzite, omega and ZSM-4 are isostructural aluminosilicate zeolites (Meier and Olson, "Atlas of Zeolite Structure Types", International Zeol. Assoc. Structure Comm. (1978)). Differentiation of mazzite and the theoretical omega structure (which has recently reported as a mineral found in the USSR (Rinaldi, Proc. 6th Int. Zeol. Conf., Ed. Bisio and Olson)) is difficult, and although the products of this invention are presumed to be similar to mazzite, they may also embrace the theoretical omega structure on the basis of available data. ECR-23-D may be one or the other, or quite possibly, mixtures of intergrowths of both structural types, but containing significant Zn$^{2+}$, $Cr^{3+}$, $Ni^{2+}$ and/or $Co^{2+}$ in tetrahedral framework positions in addition to $Al_{3+}$, $Si^{4+}$, $Ga^{3+}$ or $Ge^{+4}$.

The structure has a large open channel and, in various ion exchanged forms may be expected to have important catalytic applications in such areas as cracking, isomerization, dewaxing, reforming, polymerization and Fischer-Tropsch synthesis chemistry. Prior art aluminosilicates of this type have been successfully evaluated in many such applications (e.g., British Patents 1,210,335 and 1,211,973; U.S. Pat. Nos. 3,914,331, 3,923,639, and 4,021,447). Iron impregnated and/or exchanged forms of ECR-23-D should be particularly useful catalysts for hydrocarbon synthesis from CO and $H_2$ mixtures because of the possibility of interactions between framework transition metal oxyhydroxide species resulting from demetallation of the lattice, and the impregnated or exchanged species.

Furthermore, it is anticipated that the transition-metal aluminosilicate catalyst, ECR-23-D, may provide the basis of various processed for forming high silica zeolites in that divalent transition metals may be easier to remove by acid leaching of the framework by virtue of the higher solubility of their ions in acidic solutions and a lower tendency to form polymeric species at acid pH. Similarly, hydrothermal treatment of these metallo-aluminosilicates should preferentially hydrolyze the framework transition metal, making it more readily removable, and thus enhancing the silica content of the framework.

The metallo-aluminosilicate catalysts of this invention may be prepared by forming a reaction mixture comprising an alumina source, a silica source, a divalent transition metal source, a sodium oxide source, an organic template, and an optionally source of nucleating seeds.

The sodium oxide source may be its silicates or its hydroxides. The silica may be derived from a wide variety of sources. For instance, the source may be a silica gel, silica acid, aqueous colloidal silica sols, fume silicas and chemically precipitated silica sols. The sodium and silica may be derived from a single source such as sodium silicate.

The alumina source may be sodium aluminate, metakaolin, alumina, hydrated alumina, aluminum alkoxides or the like.

The transition metal source may be any divalent transition-metal-containing soluble salt preferably of a strong acid, e.g., nitrates, chlorides, sulfates, etc.

The templating agent may be a hydroxide or salt of tetramethylammonium, bis-dihydroxy ethyldimethylammonium, triethylene diamine, 1,4 diazabicyclo (2,2,2) octane, pyrrolidine, or choline.

The use of a seeding mixture is preferred. The seeds may be microcrystalline mazzite-like products, ECR-23-D, or nucleation slurried of the types described in U.S. Pat. Nos. 3,433,589; 3,574,538; and 4,178,353. Seeding is effective when used at a level equivalent to 0.1 and 10% based on the weight of the product. Cold aging may also initiate nucleation in place of the added seeds, but this method is slower than seeding.

The relative amounts of ingredients in the reaction mixture will be such that the mixture has a composition, in terms of mole ratios of oxides, within the following ranges:

| Oxide Constituents | General Ranges | Preferred Ranges |
| --- | --- | --- |
| $SiO_2:Al_2O_3$ | 4 to 30 | 4 to 15 |
| $DO:Al_2O_3$ | 0.02 to 4.0 | 0.02 to 2.0 |
| $Na_2O:(Al_2O_3 + DO/2)$ | 1.4 to 6 | 1.8 to 4 |
| $H_2O:(Al_2O_3 + DO/2)$ | 80 to 400 | 100 to 250 |
| $R_2O:(Al_2O_2 + DO/2)$ | 0.02 to 3.0 | 0.02 to 1.0 |

Although the order of mixing the ingredients is not believed to be critical (except for the final addition of the acidic metal salt) in that the ingredients may be added simultaneously or sequentially, the preferred method is somewhat more involved.

The preferred method involves preparation of a sodium aluminate solution by dissolving the alumina source in a hot concentrated sodium hydroxide solution. Preferably, the temperature is between 70° C. and 100° C.

The transition metal source is dissolved in water, possibly acidified with an acid having an anion the same as the dissolved transition-metal source.

The cooled sodium aluminate solution is then mixed, preferably with vigorous stirring, with a sodium silicate solution. The seeds and templating agent are slowly added to the stirred mixture. The transition metal solution is slowly added to the resulting mixture, also with vigorous mixing.

The resulting reaction mixture is then placed in a reactor, ordinarily one which can withstand elevated pressures, e.g., a polytetrafluoroethylene-lined jar or an autoclave. The mixture is maintained at a temperature between about 70° C. and 250° C., preferably between about 90° C. and 180° C. Most preferably, the temperature is about 100° C. The exact temperature will, of course, depend upon the amount of sodium oxides present and the length of time available for reaction.

When the homogenized mixture is heated, it is maintained at the autogeneous pressures resulting from the temperature employed. The length of time required to produce the product crystals will depend mainly upon temperatures employed. At the most preferable temperature of 100° C., the time required for reaction is generally in the range of two to six days. Broadly, the heating will take place for as long as is desired or necessary to produce crystals of the desired product.

The product crystals may be recovered by, e.g., filtration or centrifugation, and are then washed to remove extra mother liquor. The washing should continue, with the wash water equilibrated with the product crystals, until the water has a pH between about 9 and about 12. The crystals may then be dried. Calcination, in an oxygen atmosphere, at a temperature between 400° C. and 600° C. is typically sufficient to remove the organic template. This is then followed by ion exchange into a suitable catalytic cation exchange form.

The composition of this invention may be used as a sorbent or a catalyst. In either of these applications, it may be desirable, or even necessary, to exchange the non-tetrahedral sites within the composition with cations from any of one or more members of Groups I through VIII of the Periodic Table or the rare earth metals, depending upon the intended end use. Preferably, the cations will be mono-, di-, or trivalent metal cations, particularly from Groups I, II or III of the Periodic Table, such as barium, calcium, cesium, lithium, magnesium, sodium, potassium, strontium, zinc or the like. Hydrogen, rare earth metals, or ammonium ions may be used in certain instances. The ions may be exchanged before or after calcination of the composition to remove excess or included water. The presence of these exchangeable cations will not generally cause a substantial change in the structure of the transition-metal-alumino-silicate ECR-23-D catalyst compositions.

The exchanged ECR-23-D catalysts are fabricated into extrusions, pills, spheres, granules or other suitable catalyst form by mixing with an inert binder material followed by any of the known forming procedures well known in the art, such as extruding, pilling, etc. In such cases the binder will usually comprise between 2 and 40 wt % of an inorganic oxide; clays, such as kandites, smectites etc.; or graphite, long chain fatty acids and similar inert lubricants. In some cases, often with careful choice of the cation exchanged form, the catalyst may be self bound, that is prepared with no binder material, particularly in the case of pressure pilling or tableting. Additional catalytic metals of Group 8 of the Periodic Table may be impregnated onto, or into, the catalyst either before or after this forming operation.

As noted above, the active compositions of this invention are substantially isostructural with the mazzite aluminosilicate zeolite except that a substantial amount of transition metal is found in the tetrahedral framework positions.

The more desirable catalyst promoter, "as synthesized" composition has a chemical formula in the range:

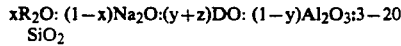

where
x=0.01 to 0.67,
y=0.02 to 0.4,
z=y±40%
D is at least one equivalent metal, e.g., Ni, Co or Zn, and
R is one or a mixture of tetramethylammonium, bis-hydroxyethyl-dimethylammonium, tri-ethylenediamine, 1,4 diazobicyclo (2,2,2) octane, pyrrolidine or choline.

The usual X-ray powder diffraction pattern is thus

TABLE 1

| DÅ(±5%) | Rel. Int. |
|---|---|
| 9.13 | VS |
| 7.89 | M-S |
| 6.88 | M-S |
| 5.97 | S |
| 4.70 | M-S |
| 3.80 | VS |
| 3.71 | M |
| 3.62 | M |
| 3.52 | S-VS |
| 3.44 | W |
| 3.15 | S |
| 3.09 | W-M |
| 3.03 | W-M |
| 2.98 | W |
| 2.92 | S |
| 2.65 | W |
| 2.63 | W |

(VS = very strong; S = strong; M = medium; W = weak)

Based on these and other data, the average hexagonal unit cell size is believed to be about 18.26 Å (±0.2) along the 'a' axis and about 7.65 Å along the 'c' axis. The pore size is about 6 Å. The inventive product is capable of adsorbing (after heating in air at high temperatures, e.g., 400° C., for dehydration) an amount of hexane equal to at least 3% by weight or water in at least 10% by weight.

EXAMPLES

The following examples illustrate the invention without limiting it in any way. In each of the examples, parts and percentages are given by weight and temperature is given in degrees Centigrade, unless otherwise noted.

EXAMPLE 1

A seed composition was made by dissolving 12.02 gm aluminum oxide trihydrate in a solution of 60 gm NaOH in 100 gm H2O at 100° C. After complete dissolution of the alumina, the solution was cooled to room temperature and added, with vigorous mixing, to a dilute solution of sodium silicate (126.3 gm H2O+201.6 gm 'N' Brand (P.Q. Corp.) sodium silicate). After homogenization, the solution was allowed to age prior to use as a nucleant slurry.

EXAMPLE 2

A gel composition of:

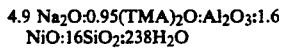

was made by first making a sodium aluminate solution by dissolving 18.9 gm Al2O3.3H2O in a solution of 15 gms of NaOH in 25 gm H2O under reflux conditions. After complete dissolution of the alumina, the solution was cooled and diluted with water to a total weight of 79.5 gms. 4 gms of aluminum sulfate (17 H2O) were dissolved in 6 gms H2O. In a blender were added in sequence: 130.6 gms sodium ilicate, 10.4 gms seeds from Example 1, 28.2 gms 25 wt % solution of TMAOH, 24.6 gms of sodium aluminate solution (as made above), 15.3 gms NiCl2.6H2O dissolved in 15.5 gm H2O, and 1.3 gm alum solution, and adjusted to a total weight of 250 gms. After thorough homogenization, the gel was placed in a capped Teflon jar and reacted at 100° C. for five days. The product was filtered, washed, dried and characterized. X-ray diffraction analysis showed the sample to be excellent ECR-23-D with spectrum given in Table 2 and FIG. 1. Chemical analysis gave a composition:

Thermogravimetric analysis indicated a TMA content of 3 wt % from burnoff at 550° C., and a total H2O plus TMA weight loss of 19%. The ECR-23-D stoichiometry was estimated to be:

indicating 5.5% of the Ni$^{2+}$ in framework positions, and 45% of the Ni$^{2+}$ as exchangeable cations.

Unit cell evaluation gave a=18.20 Å and c=7.64 Å.

EXAMPLE 3

A cobalt containing gel having a composition

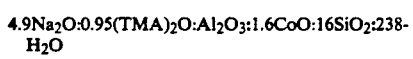

was made in an identical manner to Example 2 except that 18.7 gms of CoCl2.6H2O replaced the NiCl2.6H2O. After reacting for 72 hours at 100° C. the product was filtered, washed and dried. X-ray diffraction analysis showed the sample to comprise excellent ECR-23-D having the spectrum shown in Table 2 and FIG. 1. This was indexed on a hexagonal unit cell having dimensions a=18.22 Å and c=7.63 Å. Chemical analysis gave a composition of 6.07 Al; 25.0 Si; 4.46 Na; 9.68 Co. Thermogravimetric analysis indicated a TMA content of 4 wt %, and a maximum $H_2O$ content of 14 wt %. The chemical analysis indicates a stoichiometry of:

0.17(TMA)$_2$O:0.62Na$_2$O:0.5CoO:0.72 Al$_2$O$_3$:0.56CoO:5.72SiO$_2$ indicating 0.5 $Co^{2+}$ in cation exchange sites and 0.56 $Co^{2+}$ in framework sites.

TABLE 2

| hkl | Standard AL Mazzite dÅ | Standard AL Mazzite I/Io | Example 2 dÅ | Example 2 I/Io | Example 3 dÅ | Example 3 I/Io |
|---|---|---|---|---|---|---|
| 100 | 15.92 | 11 | 15.73 | 6 | 16.3 | 3 |
| 110 | 9.14 | 100 | 9.13 | 100 | 9.13 | 82 |
| 200 | 7.91 | 38 | 7.89 | 47 | 7.90 | 30 |
| 101 | 6.90 | 40 | 6.88 | 28 | 6.88 | 52 |
| 210 | 5.98 | 43 | 5.97 | 48 | 5.97 | 45 |
| 201 | 5.50 | 8 | 5.47 | 7 | 5.48 | 7 |
| 300 | 5.27 | 10 | 5.27 | 11 | 5.25 | 10 |
| 211 | 4.71 | 42 | 4.70 | 39 | 4.70 | 50 |
| 310 | 4.38 | 3 | 4.36 | 9 | 4.37 | 5 |
| 400 | 3.95 | 14 | — | — | 3.95 | 15 |
| 311 | 3.81 | 99 | 3.80 | 92 | 3.80 | 100 |
| 102 | 3.72 | 28 | 3.71 | 32 | 3.71 | 31 |
| 320 | 3.62 | 34 | 3.62 | 29 | 3.62 | 36 |
| 112 | 3.53 | 72 | 3.52 | 68 | 3.52 | 74 |
| 202 | 3.44 | 15 | 3.44 | 16 | 3.44 | 18 |
| 321 | 3.27 | 6 | 3.27 | 5 | — | — |
| 500 | 3.16 | 75 | 3.15 | 66 | 3.15 | 67 |
| 302 | 3.09 | 26 | 3.09 | 26 | 3.09 | 22 |
| 330 | 3.04 | 30 | 3.03 | 27 | 3.04 | 26 |
| 420 | 2.99 | 18 | 2.98 | 14 | 2.98 | 15 |
| 501 | 2.92 | 78 | 2.92 | 62 | 2.92 | 66 |
| 510 | 2.84 | 6 | 2.83 | 4 | 2.835 | 4 |
| 511 | 2.660 | 9 | 2.653 | 11 | 2.653 | 15 |
| 600 | 2.632 | 9 | 2.628 | 10 | 2.630 | 15 |
| 520 | 2.524 | 11 | 2.515 | 6 | 2.515 | 8 |
| 601 | 2.488 | 6 | 2.484 | 6 | — | — |
| 332 | 2.380 | 8 | 2.375 | 6 | 2.377 | 7 |
| 440 | 2.279 | 10 | 2.276 | 12 | 2.277 | 6 |
| 403 | 2.142 | 9 | 2.140 | 5 | 2.141 | 4 |
| 621 | 2.105 | 6 | — | — | — | — |

EXAMPLE 4

A typical synthetic aluminosilicate mazzite was prepared as a standard comparison with the novel metalloaluminosilicate compositions of this invention using a gel formulation of:

0.5(TMA)2O: 2.75Na$_2$O: Al$_2$O$_3$: 9SiO$_2$: 140H$_2$O: 1.08Na$_2$SO$_4$ reacted at 150° C. for one day in a Teflon lined Parr autoclave. The product had a stoichiometry of 0.81 Na$_2$O: Al$_2$O$_3$: 5.66SiO$_2$ after burning out the TMA template at 550° C. for 3 hours.

To make a catalyst, 15 gm of this sample was exchanged with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. This time the sample was air dried on the filter, then reslurried with 100 ml aqueous ammonia (29% NH$_3$) for 30 minutes, followed by filtration, washing on the filter with 100 ml distilled water, and drying at 110° C. in an air oven. 12 gm of this sample were exchanged to a Pt (metal) level of about 1% by contacting it with a solution of 0.212 gm Pt(NH$_3$)$_4$Cl$_2$ dissolved in 41 ml aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves.

This 4 gm catalyst sample was then loaded into a 0.5 inch diameter stainless steel reactor, and topped to 12 cm bed depth with 0.1 to 0.2 mm diameter glass beads. Reactor start-up procedures ramped the temperature to 454° C. at a rate of 3° C./minute under a hydrogen flow rate of 100 ml/minute. STP (10 barG pressure), and held the reactor at this temperature for 15 minutes before reducing the temperature to the operational temperature. At this time the n-hexane feed was introduced into the hydrogen stream to give an n-hexane equivalent space velocity (WHSV) of 2, a H$_2$/n-hexane of 2.5, and a pressure of 10 barG. Samples were recovered and analyzed on line by gas chromatography at appropriate times. These results are given in Table 3 and show that the catalyst must be run at a temperature of over 360° C. to maintain a conversion level of 50%.

EXAMPLE 5

A reaction mixture having the following oxide ratios:

.5 TMA$_2$O : 2.75 Na$_2$O: .5 NiO, Al$_2$O$_3$: 9 SiO$_2$: 140 H$_2$O was made by first making a sodium aluminate solution by dissolving 75 g aluminum oxide trihydrate in a solution containing 59 g NaOH and 100 ml H$_2$O. After cooling down, the solution was diluted to 250 g with distilled H$_2$O. In a beaker were mixed 257.4 g of sodium silicate (P.Q. Corp., N brand, 28.7% SiO$_2$; 8.9% Na$_2$O), 18.2 g of a "seed" solution (13.33 Na$_2$O: Al$_2$O$_3$: 12.5 SiO$_2$: 267 H$_2$O, see U.S. Pat. Nos. 3,574,538 and 4,340,573), and 45.3 g of sodium aluminate solution. Swirled in 51.2 g of 25% aq. TMAOH, 30.1 g of Al$_2$(SO$_4$)$_3$.17H$_2$O in 30.1 g H$_2$O, and 20.4 g Ni(NO$_3$)$_2$.6H$_2$O in 25 mls H$_2$O. The total weight of the mixture was adjusted to 500 g by addition of H$_2$O, and then thoroughly homogenized in a blender. The mixture was then placed in four 125 ml teflon lined autoclaves and reacted at 125 C for 22 hours after cold ageing for one day. The product was filtered, washed with distilled H$_2$O, and dried in a 115° C. oven. X-ray powder diffraction analysis showed the crystalline phase to be excellent ECR-23D. Elemental analysis by ICP-AES and AA gave 5.86% Na; 23.7% Si; 7.28% Al; 5.55% Ni.

15 gm of this calcined, template free, ECR-23D nickel aluminosilicate product was exchanged with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. The sample was air dried on the filter, then reslurried with 100 ml aqueous ammonia (29% NH₃) for 30 minutes, followed by filtration, washing on the filter with 100 ml distilled water, and drying at 110° C. in an air oven. This sample was formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves. (Note that this catalyst does not contain platinum.) Catalytic results for this catalyst, obtained in a similar manner to those for Example 4, are compared with the same for Example 4 in Table 3. Although this is a non-noble metal catalyst, it shows a high activity, with a stronger selectivity for cracking.

EXAMPLE 6

15 gm of the nickel aluminosilicate ECR-23D product of Example 5 was converted into a Pt copromoted catalyst by first exchanging with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. This time the sample was air dried on the filter, then reslurried with 100 ml aqueous ammonia (29% NH₃) for 30 minutes, followed by filtration, washing on the filter with 100 ml distilled water, and drying at 110° C. in an air oven. 8.6 gm of this sample were exchanged to a Pt (metal) level of about 1% by contacting it with a solution of 0.152 gm Pt(NH₃)₄Cl₂ dissolved in 30 ml aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for hone hour, at which time the temperature was reduced to 150° C. 4 gm of this catalyst was weighed into a dish and placed in a desiccator containing 3A (i.e., K-LTA) molecular sieves.

This catalyst was evaluated using the identical procedure to that used for Examples 4 and 5, with which it is compared in Table 3. The co-promoted catalyst of this example is clearly superior to those of Examples 4 and 5 in activity and selectivity for iso-C₆ products. Activities of 50% are attained at less than 340° C. (about a 25° C. advantage over the non-nickel zeolite) and this catalyst has the additional advantage of the nickel protection of the noble metal in the presence of sulfur poisons. After 18 hours on stream the catalyst showed no signs of aging, indicated by constant, reproducible and steady yield patterns at several temperatures.

These results show that the unique divalent framework substituted metallo aluminosilicates of this invention, together with their noble metal co-promoted variants, are improved over the original hydrocarbon conversion catalysts. The incorporation of high sulfur affinity transition metals in the zeolite framework is a novel approach to sulfur resistant catalyst formulations.

Having thus described the invention and provided examples showing the synthesis and the product, it should be apparent to those having ordinary skill in this art that obvious variations of the process of making the composition would be within the scope of this invention as described below.

TABLE 3

| Catalyst | Example 4 | Example 4 | Example 4 | Example 5 | Example 5 | Example 6 | Example 6 | Example 6 | Example 6 |
|---|---|---|---|---|---|---|---|---|---|
| Temp. C | 310 | 360 | 380 | 360 | 380 | 310 | 340 | 360 | 380 |
| Time on oil | 10 hr. | 12 hr | 17 hr | 4 hr | 8 hr | 5 hr | 16 hr | 18 hr | 14 hr |
| Conversion | 6.8 | 48.6 | 72.64 | 42.21 | 46.57 | 24.91 | 55.84 | 77.21 | 83.79 |
| C1 | 0.13 | 0.47 | 0.45 | 2.48 | 4.78 | 3.11 | 0.76 | 2.54 | 4.9 |
| C2 | 0.19 | 0.64 | 0.59 | 0.67 | 1.28 | 0.4 | 0.12 | 0.42 | 0.97 |
| C3 | 0.69 | 2.41 | 3.71 | 5.5 | 9.38 | 0.99 | 1.07 | 4.5 | 11.36 |
| i-C4 | 0.02 | 0.27 | 0.66 | 2.45 | 4.29 | 0.06 | 0.3 | 1.44 | 3.12 |
| n-C4 | 0.35 | 1.04 | 0.99 | 2.8 | 3.59 | 1.77 | 0.48 | 1.66 | 3.13 |
| i-C5 | 0.03 | 0.45 | 0.97 | 3.92 | 3.67 | 0.64 | 0.65 | 2.86 | 5.1 |
| n-C5 | 0.41 | 0.93 | 0.76 | 3.71 | 3.09 | 8.67 | 1.15 | 2.54 | 3.44 |
| 2,2-DMB | 0.04 | 3.23 | 9.21 | 0.77 | 0.63 | 0.19 | 3.77 | 8.29 | 7.38 |
| 2,3-DMB | 0.15 | 2.24 | 5.51 | 2.39 | 2 | 0.27 | 4.42 | 5.87 | 5.31 |
| 2-MeC5 | 2.6 | 21.38 | 28.49 | 10.21 | 8.17 | 4.97 | 25.36 | 27.59 | 22.49 |
| 3-MeC5 | 2.05 | 15.06 | 20.23 | 6.96 | 5.45 | 3.74 | 17.63 | 19.16 | 16.01 |
| n-C6(feed) | 93.2 | 51.4 | 27.36 | 57.74 | 53.43 | 75.09 | 44.16 | 22.79 | 16.21 |
| Mecyclo-C5 | 0.14 | 0.36 | 0.63 | 0.11 | 0.08 | 0.08 | 0.13 | 0.18 | 0.22 |
| Benzene | 0 | 0.07 | 0.28 | 0.14 | 0.1 | 0 | 0 | 0.03 | 0.18 |
| cyclo-C6 | 0 | 0.07 | 0.08 | 0 | 0 | 0.03 | 0 | 0 | 0.03 |

What is claimed is:

1. A crystalline microporous transition-metal-aluminosilicate having a mazzite-like structure and wherein a substantial portion of zinc is in the tetrahedral position of the transition-metal-aluminosilicate.

2. The transition-metal-aluminosilicate of claim 1 having the following chemical composition:

$xR_2O$:

where
  $x = 0.01$ to $0.67$
  $y = 0.02$ to $0.4$
  $z = y \pm 40\%$, and
  R is one or more of tetramethyl ammonium, bis-dihydroxyethyl-dimethyl ammonium, triethylene diamine, 1,4 diazobicyclo (2,2,2) octane, pyrrolidine, or choline.

3. The transition-metal-alumino-silicate of claim 1 which has been at least partially ion exchanged with a cation selected from the group consisting of Groups I through VIII of the Periodic Table, the rare earth metals an ammonium cation, and combinations thereof.

4. The transition-metal-alumino-silicate of claim 3 which has been exchanged with metal cations selected from the group consisting of barium, calcium, cesium, lithium, magnesium, sodium, potassium, strontium zinc, and combinations thereof.

5. A process for producing a microporous transition-metal-aluminosilicate having a mazzite-like aluminosilicate structure and a substantial portion of Zn within the tetrahedral framework of the transition-metal-alumino silicate, comprising the steps of:

preparing a reaction mixture comprising an alumina source, a silica source, a divalent transition metal source of Zn, a sodium oxide source, an organic template, and a seed source with substantial mixing, maintaining the reaction mixture at a temperature and for a time sufficient to crystallize said transition-metal-aluminosilicate, recovering said transition-metal-aluminosilicate hydrocarbon conversion catalyst, and calcining said catalyst to remove the trapped template ions.

6. The process of claim 5 wherein the reaction mixture has a composition, in terms of mole ratios of oxides, within the following ranges:

| | |
|---|---|
| $SiO_2:Al_2O_3$ | 4 to 30 |
| $[DO]ZnO:Al_2O_3$ | 0.02 to 4.0 |
| $Na_2O:(Al_2O_3 + [DO/2]\ ZnO)$ | 1.4 to 6 |
| $H_2O:(Al_2O_3 + [DO/2]\ ZnO)$ | 80 to 400 |
| $R_2O:(Al_2O_3 + [DO_2]\ ZnO)$ | 0.02 to 3.0. |

7. The process of claim 6 wherein the reaction mixture has a composition, in terms of mole ratios of oxides, within the following ranges:

| | |
|---|---|
| $SiO_2:Al_2O_3$ | 4 to 15 |
| $ZnO:Al_2O_3$ | 0.02 to 2.0 |
| $Na_2O:(Al_2O_3 + ZnO)$ | 1.8 to 4 |
| $H_2O:(Al_2O_3 + ZnO)$ | 100 to 250 |
| $R_2O:(Al_2O_3 + ZnO)$ | 0.02 to 1.0. |

8. The process of claim 5 wherein the sodium oxide source and alumina source are introduced into the reaction mixture as sodium aluminate.

9. The process of claim 8 wherein the transition-metal source is an aqueous solution of the salt of a strong acid.

10. The process of claim 5 wherein the reaction mixture is maintained at a temperature between about 70° C. and 250° C.

11. The process of claim 10 wherein the reaction mixture is maintained at a temperature of between about 90° C. and 180° C.

12. A product of claim 1 post-treated with a solution of a noble metal of Group 8 of the Periodic Table so as to deposit between 0.1 and 3.0 wt % of said metal within the catalyst.

13. A product of claim 12 wherein the metal is Pt or Pd or a mixture of the two.

14. A product of claim 12 used as a hydrocarbon conversion catalyst.

15. A product of claim 13 used as a hydrocarbon conversion catalyst.

16. A product of claim 12 used as catalyst in the conversion of n-paraffins to branched chain paraffins.

17. A product of claim 13 used as a catalyst in the conversion of a n-paraffin feedstock to branched chain paraffinic products.

* * * * *